United States Patent
Cecala et al.

(10) Patent No.: US 12,441,655 B2
(45) Date of Patent: Oct. 14, 2025

(54) TEXTURED GLASS-BASED ARTICLES

(71) Applicant: CORNING INCORPORATED, Corning, NY (US)

(72) Inventors: Christine Cecala, Corning, NY (US); Ronghua Chen, Fuzhou (CN); Melanie Lian Geiger, Horseheads, NY (US); Yuhui Jin, Painted Post, NY (US); Aize Li, Painted Post, NY (US); Qiao Li, Horseheads, NY (US); Kevin Barry Reiman, Horseheads, NY (US); John Richard Ridge, Hammondsport, NY (US); Wei Sun, Painted Post, NY (US); Florence Christine Monique Verrier, Corning, NY (US); David Lee Weidman, Corning, NY (US); Binwei Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/893,373

(22) Filed: Aug. 23, 2022

(65) Prior Publication Data

US 2023/0084912 A1    Mar. 16, 2023

Related U.S. Application Data

(60) Provisional application No. 63/236,925, filed on Aug. 25, 2021.

(51) Int. Cl.
*C03C 15/00* (2006.01)
*B24C 1/06* (2006.01)
*C03C 21/00* (2006.01)

(52) U.S. Cl.
CPC ............... *C03C 15/00* (2013.01); *B24C 1/06* (2013.01); *C03C 21/002* (2013.01); *C03C 2204/08* (2013.01)

(58) Field of Classification Search
CPC .......... B24C 1/06; B24C 11/00; C03C 15/00; C03C 2204/08; H05K 5/0018; H05K 5/03
See application file for complete search history.

(56) References Cited

U.S. PATENT DOCUMENTS

| | | | |
|---|---|---|---|
| 4,816,049 | A | 3/1989 | Hata et al. |
| 5,425,847 | A | 6/1995 | Narukawa et al. |

(Continued)

FOREIGN PATENT DOCUMENTS

| | | | |
|---|---|---|---|
| CN | 104016591 A | | 9/2014 |
| CN | 104445975 A | | 3/2015 |

(Continued)

OTHER PUBLICATIONS

A. Stillwell, et al., "Perception of Sparkle in Anti-Glare Display Screens," JSID, vol. 22(2), 2014, pp. 129-136.

(Continued)

*Primary Examiner* — Mark Ruthkosky
*Assistant Examiner* — Rebecca L Grusby
(74) *Attorney, Agent, or Firm* — William J. Tucker

(57) ABSTRACT

Described herein are textured glass-based articles. The textured glass based articles may include a glass-based substrate including a first major surface and a second major surface. At least a portion of one or both of the first major surface and the second major surface is textured, wherein the portion of the one or both of the first major surface and the second major surface that are textured may have a sparkle at 140 ppi of less than or equal to 5% and an uncoupled distinctness-of-image of at least 78%. Methods for making such articles are also described herein.

15 Claims, 10 Drawing Sheets

(56) References Cited

U.S. PATENT DOCUMENTS

| | | |
|---|---|---|
| 9,411,180 B2 | 8/2016 | Gollier et al. |
| 2005/0158538 A1 | 7/2005 | Li et al. |
| 2005/0211673 A1 | 9/2005 | Kurachi et al. |
| 2009/0142568 A1 | 6/2009 | Dejneka et al. |
| 2011/0201490 A1 | 8/2011 | Barefoot et al. |
| 2012/0045649 A1 | 2/2012 | Pieters |
| 2013/0081951 A1 | 4/2013 | Hankey et al. |
| 2014/0227523 A1 | 8/2014 | Dejneka et al. |
| 2015/0010720 A1 | 1/2015 | Saijo et al. |
| 2016/0102010 A1 | 4/2016 | Beall et al. |
| 2016/0280584 A1* | 9/2016 | Sinapi ............... G02B 5/0294 |
| 2016/0355689 A1* | 12/2016 | Lander ............... C09D 125/06 |
| 2017/0107140 A1 | 4/2017 | Funatsu et al. |
| 2017/0276995 A1 | 9/2017 | Sato et al. |
| 2018/0086662 A1 | 3/2018 | Luzzato et al. |
| 2018/0215657 A1* | 8/2018 | Jin ............... C03C 19/00 |
| 2018/0352668 A1 | 12/2018 | Amin et al. |
| 2019/0233326 A1 | 8/2019 | Belleville et al. |
| 2019/0300422 A1 | 10/2019 | Guo et al. |
| 2020/0002224 A1 | 1/2020 | Carleton et al. |
| 2020/0150317 A1* | 5/2020 | Huckaby ............... G02B 5/0221 |
| 2020/0361811 A1 | 11/2020 | Hievner et al. |
| 2020/0377406 A1 | 12/2020 | Fahey et al. |
| 2021/0002166 A1* | 1/2021 | Lu ............... G02B 3/0043 |
| 2021/0070652 A1 | 3/2021 | Amin et al. |
| 2021/0163344 A1* | 6/2021 | Sinapi ............... G02B 5/0278 |
| 2021/0230052 A1* | 7/2021 | Ikadai ............... G02F 1/1333 |
| 2022/0169563 A1 | 6/2022 | Cannon Wilson et al. |

FOREIGN PATENT DOCUMENTS

| | | |
|---|---|---|
| CN | 111116047 A | 5/2020 |
| CN | 112897888 A | 6/2021 |
| JP | 06-092743 A | 4/1994 |
| JP | 5757278 B2 | 7/2015 |
| WO | 2014/112446 A1 | 7/2014 |
| WO | 2014/132983 A1 | 9/2014 |
| WO | 2020/149040 A1 | 7/2020 |
| WO | 2021/050493 A1 | 3/2021 |
| WO | 2021/113196 A1 | 6/2021 |

OTHER PUBLICATIONS

C. Cecala, et al., "Fourier Optics Modeling of Display Sparkle from Anti-Glare Cover Glass: Comparison to Experimental Data", Optical Society of America Imaging and Applied Optics Congress, JW5B.8, 2020.

International Search Report and Written Opinion of the International Searching Authority; PCT/US2022/041141; mailed on Jan. 9, 2022, 11 pages; European Patent Office.

\* cited by examiner

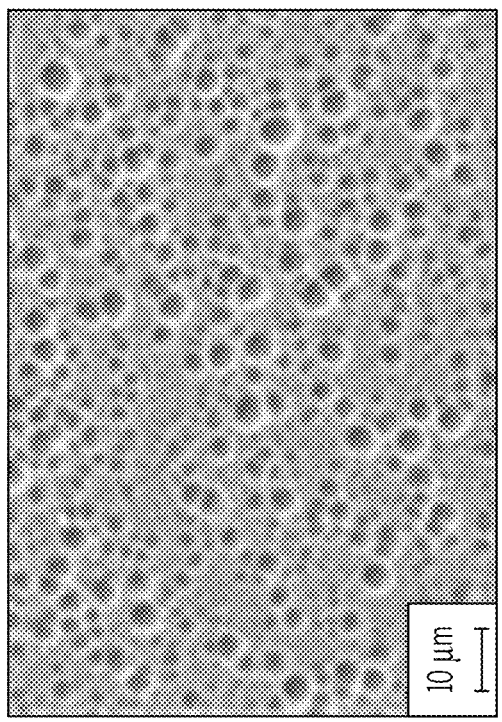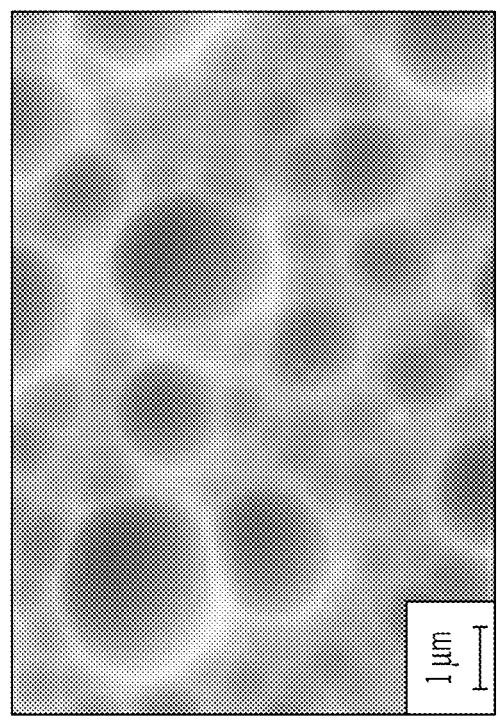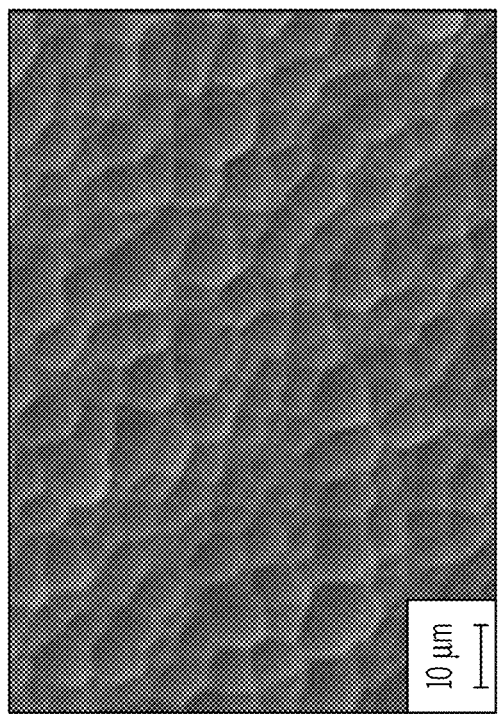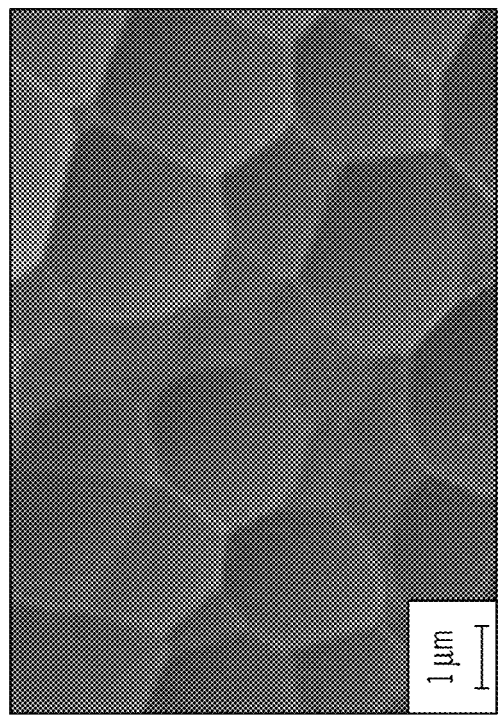
FIG. 7A
FIG. 7B

TEXTURED GLASS-BASED ARTICLES

CLAIM OF PRIORITY

This application claims the benefit of priority under 35 U.S.C. § 119 of Chinese Patent Application Serial No. 202111445595.8, filed on Nov. 30, 2021, and this application also claims the benefit of priority under 35 U.S.C. § 119 of U.S. Provisional Patent Application No. 63/236,925, filed on Aug. 25, 2021, the disclosures of which are incorporated by reference herein in their entirety.

BACKGROUND

Field

The present specification generally relates to textured glass-based articles and, more specifically, to textured glass-based articles that are useful in mobile electronic devices.

Technical Background

Portable electronic devices, such as, smartphones, tablets, and wearable devices (such as, for example, watches and fitness trackers) utilize glass-based materials. For example, screens on such portable electronic devices may be made of glass-based materials. Optical properties associated with good viewing of the screen are generally sought. Coatings or other surface treatments may be used to enhance glass materials. However, current glass-based materials have optical limitations.

Accordingly, a need exists for glass-based materials with different optical characteristics, and methods of producing such materials. This need and other needs are addressed by the present disclosure.

SUMMARY

According to one or more embodiments, a textured glass-based article may comprise a glass-based substrate comprising a first major surface and a second major surface. The first major surface is opposite the second major surface. At least a portion of one or both of the first major surface and the second major surface may be textured, The portion of the one or both of the first major surface and the second major surface that are textured may have a sparkle at 140 ppi of less than or equal to 5% and an uncoupled distinctness-of-image of at least 78%.

According to another embodiment, a consumer electronic product may comprise a housing, electrical components, and a cover substrate. The housing has a front surface, a back surface and side surfaces. The electrical components may be provided at least partially within the housing, the electrical components including at least a controller, a memory, and a display, the display being provided at or adjacent the front surface of the housing. The cover substrate may be disposed over the display. At least a portion of at least one of the housing and the cover substrate may comprise a textured glass-based article comprising a glass-based substrate comprising a first major surface and a second major surface. The first major surface is opposite the second major surface. At least a portion of one or both of the first major surface and the second major surface may be textured, The portion of the one or both of the first major surface and the second major surface that are textured may have a sparkle at 140 ppi of less than or equal to 5% and an uncoupled distinctness-of-image of at least 78%.

According to another embodiment, a textured glass-based article may be made by a method comprising abrading a surface of a glass-based substrate to form an abraded surface by propelling abrasive particles against the surface, and etching the abraded surface with an etchant to form an etched glass-based substrate. The abrading of the surface of the glass-based substrate may be with an abrasive media having an average dimeter of less than or equal to 3 microns.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

BRIEF DESCRIPTION OF THE DRAWINGS

FIGS. 7A-7D depict scanning electron microscopy (SEM) images of abraded and etched glass samples, according to one or more embodiments described herein.

DETAILED DESCRIPTION

Figure 1:
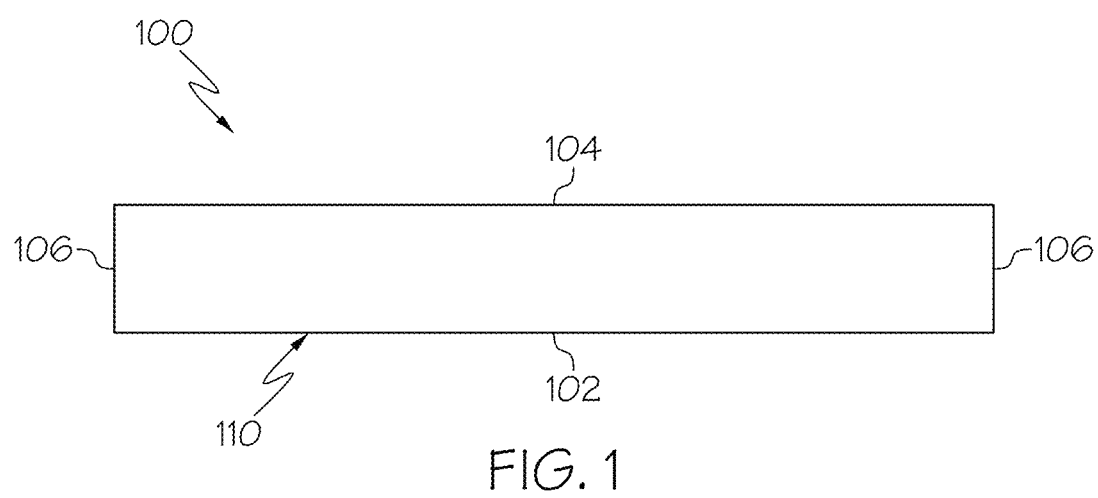
FIG. 1 schematically depicts a cross-sectional view of a textured glass-based article, according to one or more embodiments described herein.

Reference will now be made in detail to textured glass-based articles according to various embodiments. In particular, the textured glass-based articles are suitable for use as display covers and/or housings in portable electronic devices. The textured glass-based articles may have both relatively low sparkle as well as relatively high distinctness-of-image, the combination of which may be desirable for uses in, for example, portable electronic devices. This combination of relatively low sparkle and relatively high distinctness-of-image may be desirable over conventional glass-based articles where, generally, there is a trade-off between relatively low sparkle and relatively high distinctness-of-image.

The embodiments described herein may be formed by a process that includes abrasion of a glass-based substrate (sometimes sandblasting) followed by etching. As described herein, it is possible to provide particular combinations of distinctness-of-image and sparkle by utilizing particular sandblasting media size, pressure, or both. In particular, smaller sandblasting media may promote smaller surface features. Additionally, higher pressure sandblasting may promote more uniform surface coverage following etching. Both of these physical characteristics may affect sparkle and distinctness-of-image, as well as other properties like haze.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions of the glasses described herein are expressed in terms of mole percent (mol %), and the constituents are provided on an oxide basis. Unless otherwise specified, all temperatures are expressed in terms of degrees Celsius (° C.). All ranges disclosed in this specification include any and all ranges and subranges encompassed by the broadly disclosed ranges whether or not explicitly stated before or after a range is disclosed It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As utilized herein, when the term "about" is used to modify a value, the exact value is also disclosed.

The textured articles described herein are glass-based. As utilized herein, the term "glass-based" refers to any article that includes glass, such as a glass or glass-ceramic material. For example, a glass-based article may be a laminated material where at least one laminate layer includes a glass or glass-ceramic.

As is depicted in FIG. 1, the glass-based articles 100 may comprise a body 110, a first major surface 102, and a second major surface 104. The glass-based articles 100 may further include edges 106. Where the glass-based article 100 is a sheet, as schematically depicted in FIG. 1, the first major surface 102 may be opposite the second major surface 104, and each may be substantially planar. A thickness of the glass-based article 100 may be measured between the first major surface 102 and the second major surface 104. In the embodiments described herein, at least a portion of one or both of the first major surface 102 or the second major surface 104 is textured, as is described in detail herein. In additional embodiments, the edges 106 may be textured but, generally, optical performance altered by the texturing is not measured on the edges of a glass sheet, so in many embodiments the edges 106 are not textured. According to embodiments, the entirety any one or more of the first major surface 102, second major surface 104, or edges 106 are textured (where texturing is not explicitly depicted in FIG. 1 since the texturing features are generally very small and undetectable by the human eye). In additional embodiments, only portions of any one or more of the first major surface 102, second major surface 104, or edges 106 are textured.

In one or more embodiments, the textured surfaces are not coated with an optical coating. It should be understood that while some coatings may be utilized to produce the sparkle and distinctness-of-image properties disclosed herein, the presently disclosed embodiments do not include optical coatings. Optical coatings, as described herein, appreciably affect the optical characteristics of the glass-based substrate.

In one or more additional embodiments, the textured surfaces are coated. Example coatings include anti-reflective coatings and/or anti-fingerprint coatings, sometimes referred to as easy-to-clean or anti-smudge coatings. Anti-reflective coatings may, without limitation, comprise materials having layers of alternating refractive index or varying refractive index, such as refractive index gradients. Easy to clean coating may include, without limitation, fluoroalkylsilanes, perfluoropolyether alkoxy silanes, perfluoroalkyl alkoxy silanes, fluoroalkylsilane-(non-fluoroalkylsilane) copolymers, and mixtures of fluoroalkylsilanes. Coatings may be applied by known processes such as by a chemical vapor deposition ("CVD"), physical vapor deposition ("PVD"), thermal evaporation, or atomic layer deposition (ALD), as would be understood by those skilled in the art based on the desired coating.

Figure 2A:
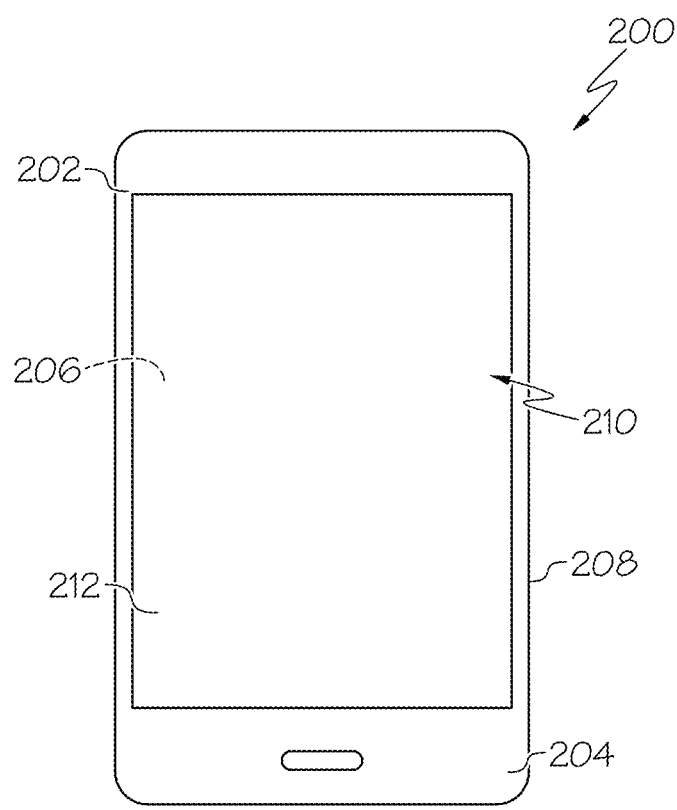
FIG. 2A is a plan view of an exemplary electronic device incorporating a glass-based articles, according to one or more embodiments described herein.
Figure 2B:
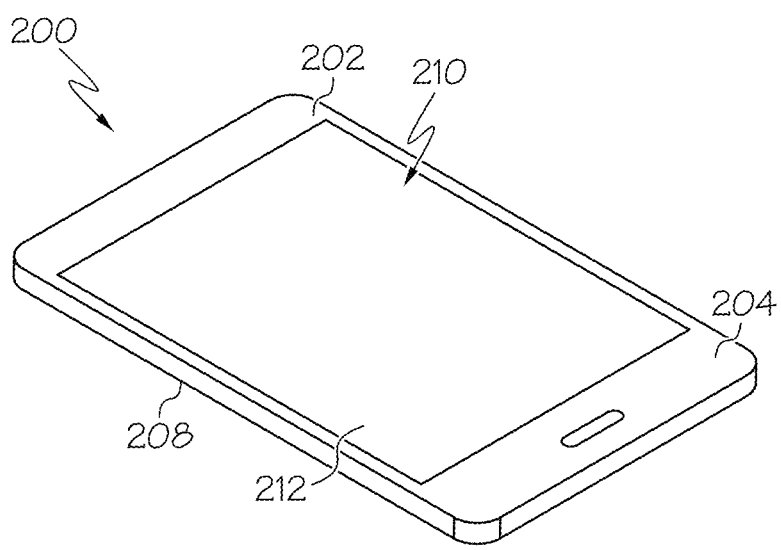
FIG. 2B is a perspective view of the exemplary electronic device of FIG. 2A, according to one or more embodiments described herein.

The textured glass-based articles 100 disclosed herein, as-formed or following ion exchanged, may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In embodiments, at least a portion of at least one of the cover substrate 212 and/or the housing 202 may include any of the glass-based articles disclosed herein.

As described above, the textured glass-based articles 100 described herein can be used as a front or back cover for mobile electronic devices. The glass-based articles 100 not only serve as protective covers but also serve to enable various functionalities of the mobile electronic devices. For example, the textured glass-based articles 100 may possess desirable antiglare properties which improve display readability in the presence of strong ambient light conditions, may improve the touch feel, and may also provide a desirable aesthetic appearance.

The glass-based articles 100 described herein may be characterized by uncoupled distinctness-of-image value. "Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to equation (1):

$$DOI = [1 - R_{os}/R_s] \times 100 \qquad (1)$$

where $R_s$ is the relative amplitude of reflectance in the specular direction and $R_{os}$ is the relative amplitude of reflectance in an off-specular direction. As described herein, $R_{os}$, unless otherwise specified, is calculated by averaging the reflectance over an angular range from 0.2° to 0.4° away from the specular direction. $R_s$ can be calculated by averaging the reflectance over an angular range of ±0.05° centered on the specular direction. Both $R_s$ and $R_{os}$ can be measured using a goniophotometer (Rhopoint IQ (Goniophotometer) 20°/60°/85°, Rhopoint Instruments) that is calibrated to a certified black glass standard, as specified in ASTM procedures D523 and D5767. The Rhopoint IQ instrument uses a detector array in which the specular angle is centered about the highest value in the detector array. DOI is evaluated using the 2-side (reflections allowed from both glass surfaces, nothing coupled to glass) method, where the result is referred to as the "uncoupled distinctness-of-image." The 2-side measurement enables gloss, reflectance, and DOI to be determined for the glass article as a whole. The $R_{os}/R_s$ ratio can be calculated from the average values obtained for $R_s$ and $R_{os}$ as described above. "20° DOI," or "DOI 20°" refers to DOI measurements in which the light is incident on the sample at 20° off the normal to the glass surface, as described in ASTM D5767. The measurement of either DOI or common gloss using the 2-side method can best be performed in a dark room or enclosure so that the measured value of these properties is zero when the sample is absent.

In one or more embodiments, the portions of the glass-based articles 100 that are textured may have an uncoupled distinctness-of-image of at least 78%. For example, in one or more embodiments, the portions of the glass-based articles 100 that are textured may have an uncoupled distinctness-of-image of at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or even at least 99%.

The glass-based articles 100 described herein may be further characterized by sparkle. "Sparkle," "sparkle contrast," "display sparkle," "pixel power deviation," "PPD", or like terms refers to the visual phenomenon that occurs when a textured transparent surface is combined with a pixelated display. Generally speaking, quantitation of sparkle involves imaging a lit display or simulated display with the textured surface in the field of view. The calculation of sparkle for an area P is equal to $\sigma(P)/\mu(P)$, where $\sigma(P)$ is the standard deviation of the distribution of integrated intensity for each display pixel contained within area P divided by the mean intensity $\mu(P)$. Following the guidance in: (1) J. Gollier, et al., "Apparatus and method for determining sparkle," U.S. Pat. No. 9,411,180B2, United States Patent and Trademark Office, 20 Jul. 2016; (2) A. Stillwell, et al., "Perception of Sparkle in Anti-Glare Display Screens," JSID 22(2), 129-136 (2014); and (3) C. Cecala, et al., "Fourier Optics Modeling of Display Sparkle from Anti-Glare Cover Glass: Comparison to Experimental Data", Optical Society of America Imaging and Applied Optics Congress, JW5B.8 (2020); one skilled in the art can build an imaging system to quantify sparkle. Alternatively, a commercially available system (e.g. the SMS-1000, Display Messtechnik & Systeme GmbH & Co. KG, Germany) can also be used. As described herein, sparkle is measured with a 140 PPI display. A 140 PPI display (e.g. Z50, Lenovo Group Limited, Hong Kong) with only the green subpixels lit (R=0, B=0, G=255), at full display brightness is imaged using a f=50 mm lens/machine vision camera combination (e.g. C220503 1:2.8 50 mm Φ30.5, Tamron, Japan) and Stingray F-125 B, Allied Vision Technologies GmbH, Germany). The lens settings are aperture=5.6, depth of field=0.3, working distance=about 290 mm; with these settings, the ratio of display pixels to camera pixels is approximately 1 to 9. The field of view for analysis contains approximately 7500 display pixels. Camera settings have the gain and gamma correction turned off. Periodic intensity variations from, e.g. the display, and non-periodic intensity variations, e.g. dead pixels, are removed during analysis prior to the calculation of sparkle.

In one or more embodiments, the portions of the glass-based article 100 that are textured may have a sparkle at 140 ppi of less than or equal to 5%. For example, in one or more embodiments, the portions of the glass-based article 100 that are textured may have a sparkle at 140 ppi of less than or equal to 5%, less than or equal to 4.75%, less than or equal to 4.5%, less than or equal to 4.25%, less than or equal to 4%, less than or equal to 3.75%, less than or equal to 3.5%, less than or equal to 3.25%, less than or equal to 3%, less than or equal to 2.75%, less than or equal to 2.5%, less than or equal to 2.25%, or even less than or equal to 2.

Textured glass-based articles 100 described herein may be produced utilizing a variety of processes, such as abrasion combined with etching techniques. The glass-based articles 100 suitable for use as display covers may be produced by techniques that combine sandblasting and etching processes. In some embodiments, the etching is performed utilizing a basic etchant. In other embodiments, the etching may be performed using an acidic etchant, such as hydrofluoric acid. However, the use of hydrofluoric acid presents significant safety and environmental challenges. Alternative techniques, such as those that do not employ HF acid etching have previously exhibited long manufacturing times (slow manufacturing throughput) and/or inferior surface, optical, and mechanical properties.

The processes described herein that utilize basic etchants are capable of producing glass-based articles 100 with surface, optical, and mechanical properties equivalent to those produced by an HF acid etching process while also exhibiting a desirable manufacturing throughput capability. The processes may be relatively fast and produces a substantially uniform surface. In addition, the processes described herein do not utilize HF acid, and thereby avoid the safety and environmental risks associated with HF acid.

While it should be understood that many various processes may be utilized to make the textured glass-based articles 100 described herein (e.g., those with relatively high distinctness-of-image and relatively low sparkle), embodiments utilizing abrasion and etching are described in detail herein.

Figure 8:
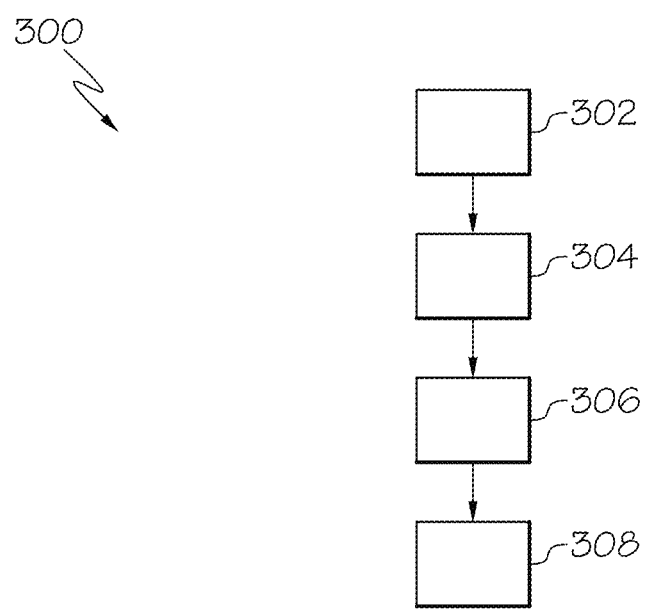
FIG. 8 schematically depicts a flow diagram of a process for fabricating a glass-based article, according to one or more embodiments described herein.

Now referring to FIG. 8, a process 300 for forming such glass-based articles 100 is schematically depicted. The process may include pre-texturing processing step 302, abrasion step 304, etching step 306, and post-texturing processing step 308. In general, pre-texturing processing step 302 and post-texturing processing step 308 are optional.

In pre-texturing processing step 302 the glass-based article may be prepared for subsequent steps. This may include sizing or cleaning of the glass-based article. Additionally, step 302 may include applying a mask or cover to portions of the glass-based article in which texturing is not desired. Examples of suitable masking techniques and materials are provided in U.S. Provisional Patent Application 63/236,882 (filed Aug. 25, 2021), the teachings of which are incorporated by reference herein. Such steps are contemplated as optional in the embodiments described herein.

In one or more embodiments, the processes include an abrasion step 304 and etching step 306. The abrasion step 304 includes abrading a surface of a glass-based substrate by propelling abrasive particles against the surface to form an abraded surface. The etching step 306 includes etching the abraded surface with an etchant to form an etched glass-based substrate.

In embodiments, the abrasion process of step 304 may be a particulate blasting process, commonly referred to as media blasting or sand blasting, in which abrasive particles are propelled against the surface of the glass-based substrate by a pressurized fluid medium. The abrasion process may include one or more treatments of the surface. In embodiments, the abrasion process may be repeated one or more times to achieve the desired effect.

The abrasion process may employ any appropriate abrasive particles. In embodiments, the abrasive particles may include any one of sand, $Al_2O_3$, SiC, or $SiO_2$, and combinations thereof. The abrasive particles may have a particle size selected to produce the desired abrading effect, as is described in detail hereinbelow.

The abrasion process may employ any appropriate pressure and arrangement. In embodiments, the abrasive particles may be propelled by a fluid medium at a pressure greater than or equal to 5 psi to less than or equal to 100 psi, such as from 5 psi to 10 psi, from 10 psi to 15 psi, from 15 psi to 20 psi, from 20 psi to 25 psi, from 25 psi to 30 psi, from 30 psi to 35 psi, from 35 psi to 40 psi, from 40 psi to 45 psi, from 45 psi to 50 psi, from 50 psi to 55 psi, from 55 psi to 60 psi, from 60 psi to 65 psi, from 65 psi to 70 psi, from 70 psi to 75 psi, from 75 psi to 80 psi, from 80 psi to 85 psi, from 85 psi to 90 psi, from 90 psi to 95 psi, from 95 psi to 100 psi, or combinations thereof, including any and all ranges formed from any of the foregoing endpoints.

In embodiments, the fluid medium propelling the abrasive particles may be air. In embodiments, the abrasive particles are propelled from a nozzle at a distance from the surface of greater than or equal to 5 cm to less than or equal to 20 cm, such as greater than or equal to 6 cm to less than or equal to 19 cm, greater than or equal to 7 cm to less than or equal to 18 cm, greater than or equal to 8 cm to less than or equal to 17 cm, greater than or equal to 9 cm to less than or equal to 16 cm, greater than or equal to 10 cm to less than or equal to 15 cm, greater than or equal to 11 cm to less than or equal to 14 cm, greater than or equal to 12 cm to less than or equal to 13 cm, and any and all sub-ranges formed from any of the foregoing endpoints. The nozzle may be positioned such that the abrasive particles are propelled against the surface of the glass-based substrate at any angle from orthogonal to the surface, wherein an angle of 0° indicates that the abrasive particles are propelled along a path orthogonal to the surface. In embodiments, the abrasive particles are propelled against the surface of the glass-based substrate at any angle from orthogonal to the surface of greater than or equal to 0° to less than or equal to 60°, such as greater than or equal to 5° to less than or equal to 55°, greater than or equal to 10° to less than or equal to 50°, greater than or equal to 15° to less than or equal to 45°, greater than or equal to 20° to less than or equal to 40°, greater than or equal to 25° to less than or equal to 35°, greater than or equal to 0° to less than or equal to 30°, and any and all sub-ranges formed from any of the foregoing endpoints.

The etching process of step 306 may be selected to achieve a surface removal rate that provides the desired etching speed. In general, faster etching rates are desired, as fast etching rates increase manufacturing throughput. However, when an etching rate is too high surface uniformity may be reduced and cosmetic defects may develop. The etching rate is a function of the etchant and the composition of the glass-based substrate. In embodiments utilizing basic etchants, the etching may occur at a surface removal rate of less than or equal to 10 μm/hour, such as less than or equal to 9.5 μm/hour, less than or equal to 9 μm/hour, less than or equal to 8.5 μm/hour, less than or equal to 8 μm/hour, less than or equal to 7.5 μm/hour, less than or equal to 7 μm/hour, less than or equal to 6.5 μm/hour, less than or equal to 6 μm/hour, less than or equal to 5.5 μm/hour, less than or equal to 10 μm/hour, or less. Considerably faster speeds may be attained when utilizing HF.

The etching process of step 306 is conducted for a time period sufficient to produce the desired surface properties, such as distinctness-of-image and sparkle. In some embodiments utilizing basic etchants, the glass-based substrate is contacted with the etchant for a time period of greater than or equal to 30 minutes to less than or equal to 400 minutes, such as greater than or equal to 30 minutes to less than or equal to 300 minutes, greater than or equal to 40 minutes to less than or equal to 390 minutes, greater than or equal to 50 minutes to less than or equal to 380 minutes, greater than or equal to 60 minutes to less than or equal to 370 minutes, greater than or equal to 70 minutes to less than or equal to 360 minutes, greater than or equal to 80 minutes to less than or equal to 350 minutes, greater than or equal to 90 minutes to less than or equal to 340 minutes, greater than or equal to 100 minutes to less than or equal to 330 minutes, greater than or equal to 110 minutes to less than or equal to 320 minutes, greater than or equal to 120 minutes to less than or equal to 310 minutes, greater than or equal to 130 minutes to less than or equal to 300 minutes, greater than or equal to 140 minutes to less than or equal to 290 minutes, greater than or equal to 150 minutes to less than or equal to 280 minutes, greater than or equal to 160 minutes to less than or equal to 270 minutes, greater than or equal to 170 minutes to less than or equal to 260 minutes, greater than or equal to 180 minutes to less than or equal to 250 minutes, greater than or equal to 190 minutes to less than or equal to 240 minutes, greater than or equal to 200 minutes to less than or equal to 230 minutes, greater than or equal to 210 minutes to less than or equal to 220 minutes, and any and all sub-ranges formed from any of the foregoing endpoints. Considerably less time may be utilized when HF is the etchant.

The etchant may have any appropriate composition. In some embodiments, the etchant is an aqueous hydroxide solution with a hydroxide concentration of greater than or equal to 5 wt % to less than or equal to 50 wt %, such as greater than or equal to 10 wt % to less than or equal to 45 wt %, greater than or equal to 15 wt % to less than or equal to 40 wt %, greater than or equal to 20 wt % to less than or equal to 35 wt %, greater than or equal to 25 wt % to less than or equal to 30 wt %, and any and all sub-ranges formed from any of the foregoing endpoints. In embodiments, the etchant includes NaOH, KOH, or combinations thereof. The etchant may be substantially free or free of hydrofluoric acid. In some embodiments, the glass-based articles 100 described herein are produced without employing hydrofluoric acid.

The etchant may be at an elevated temperature during the etching process. The elevated temperature may increase the etching rate. In embodiments, the etchant is at a temperature of greater than or equal to 90° C. to less than or equal to 140° C., such as greater than or equal to 90° C. to less than or equal to 132° C., greater than or equal to 95° C. to less than or equal to 135° C., greater than or equal to 100° C. to less than or equal to 130° C., greater than or equal to 105° C. to less than or equal to 125° C., greater than or equal to 110° C. to less than or equal to 120° C., greater than or equal to 90° C. to less than or equal to 115° C., and any and all sub-ranges formed from the foregoing endpoints.

The etching rate and etching time of step 306 may be selected to remove a desired amount of material from the surface of the glass-based substrate. If the amount of material removed in the etching step is too low the desired surface properties, such as distinctness-of-image and sparkle, may not be achieved. Removing too much material from the abraded surface may increase cost and reduce manufacturing throughput. In embodiments, the etching process may remove greater than or equal to 5 µm to less than or equal to 50 µm from the abraded surface, such as greater than or equal to 10 µm to less than or equal to 45 µm, greater than or equal to 15 µm to less than or equal to 40 µm, greater than or equal to 20 µm to less than or equal to 35 µm, greater than or equal to 25 µm to less than or equal to 30 µm, and any and all ranges formed from the foregoing endpoints. The amount of material removed from the abraded surface is measured in the thickness direction of the glass-based articles 100 by micrometer unless otherwise indicated.

It has been discovered that the size of sandblasting media and sandblast pressure in step 304 has an effect on the depth of surface damages. Additionally, the pressure and length of sandblasting affect the density of damages made by the sandblasting. Without being bound by any particular theory, it is believed that different optical properties may be attained by adjusting the sandblasting media size, sandblasting pressure, sandblasting time, or combinations of these. In particular, utilizing relatively small sandblasting media may produce smaller surface features in the etched surface. Additionally, higher sandblasting pressure or more sandblast time may produce more uniform coverage of surface features.

Figure 3A:
FIGS. 3A-3C schematically depict glass-based substrates in an abraded state and etched state with varying sand blasting media and pressure, according to one or more embodiments described herein.
Figure 3B:
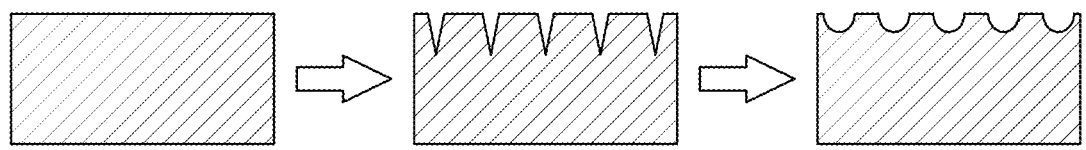
Figure 3C:
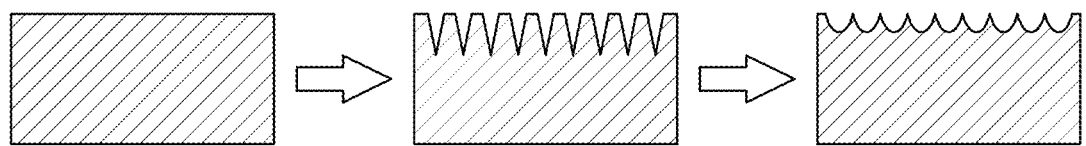

Now referring to FIGS. 3A-3C, three examples glass-based substrates prior to sandblasting (left), following sandblasting (middle), and following etching (right) are schematically depicted. In FIG. 3A, a relatively large sandblasting media (i.e. abrasive particles) is utilized (e.g., average diameter of 3-15 microns) with a relatively low sandblasting pressure. This may be representative of a comparative example. FIG. 3B is representative of an embodiment similar to that of FIG. 3A, but sandblasting media size is reduced to, e.g., an average diameter of 1-3 microns. As is depicted, the defects in the embodiment of FIG. 3B are not as deep as those in FIG. 3A. Once etched, the surface features of the embodiment of FIG. 3B are not as deep as those of FIG. 3A. Additionally, FIG. 3C depicts an embodiment similar to that of FIG. 3B, but with increased sandblasting pressure. As is depicted, the increased sandblasting pressure produces more defects and, following etching, better coverage of the surface of the glass-based substrate by surface features is present.

Without being bound by any particular theory, it is believed that the embodiments of FIGS. 3B and 3C may have desirable sparkle and distinctness-of-image. As such, embodiments having favorable sparkle and distinctness-of-image may utilize relatively small abrasive particles in step 304, such as those having an average diameter of less than or equal to 3 microns, such as an average diameter of from 1 micron to 3 microns. For example, the abrasive particles may have an average diameter of from 1 micron to 1.2 microns, from 1.2 microns to 1.4 microns, from 1.4 microns to 1.6 microns, from 1.6 microns to 1.8 microns, from 1.8 microns to 2 microns, from 2 microns to 2.2 microns, from 2.2 microns to 2.4 microns, from 2.4 microns to 2.6 microns, from 2.6 microns to 2.8 microns, from 2.8 microns to 3 microns, or any combination of these ranges.

According to three different embodiment, the abrasive particles utilized in the abrasion process of step 304 may have an average diameter of from 1 micron to 3 microns, and the pressure used for abrasion may be from 43.5 to 87.0 psi in the first embodiment, from 58 psi to 87 psi in the second embodiment, and from 72.5 psi to 87 psi in the third embodiment. Varying affects in texture may be achieved by utilizing these combinations of particle size and pressure, as are discussed in the examples that follow.

Following etching step 306, optional post-texturing processing step 308 may be performed. This step 308 may include removal of the mask (if a mask was used), ion exchange of the textured glass-based article 100, or application of coatings as described herein. The ion exchanging step may include ion exchanging the etched glass-based substrate with a molten salt bath to form a glass-based articles 100 that includes a compressive stress layer extending from a surface thereof to a depth of compression. The process, in one or more embodiments, produces glass-based articles 100 with desirable distinctness-of-image and sparkle.

The glass-based substrates utilized to form the textured glass-based articles 100 may have any suitable composition. The composition of the glass-based substrates influences the etching rate, as illustrated in the examples described herein. Selecting glass-based substrates that exhibit fast etch rates increases manufacturing throughput.

In embodiments, the glass-based substrates may include a glass ceramic. Exemplary glass ceramic materials are those described in U.S. Patent App. Pub. No. 2016/0102010 A1, titled "High Strength Glass-Ceramics Having Petalite and Lithium Silicate Structures," published Apr. 14, 2016, the contents of which are incorporated herein by reference in their entirety.

In embodiments, the glass-based substrates may include an alkali aluminosilicate glass, such as a lithium aluminosilicate glass. Exemplary lithium aluminosilicate glass materials are those described in U.S. Patent App. Pub. No. 2019/0300422 A1, titled "Glasses Having High Fracture Toughness," published Oct. 3, 2019, the contents of which are incorporated herein by reference in their entirety. In additional embodiments, alkaline earth aluminosilicate glass may be utilized.

In embodiments, the glass-based substrates may include an alkali aluminosilicate that is substantially free or free of lithium. Exemplary alkali aluminosilicate glass materials that are substantially-free or free of lithium are those described in U.S. Patent App. Pub. No. 2009/0142568 A1, titled "Glasses Having Improved Toughness and Scratch Resistance," published Jun. 4, 2009, U.S. Patent App. Pub. No. 2009/0142568 A1, titled "Glasses Having Improved Toughness and Scratch Resistance," published Jun. 4, 2009; U.S. Patent App. Pub. No. 2014/0227523 A1, titled "Zircon Compatible, Ion Exchangeable Glass With High Damage Resistance," published Aug. 14, 2014; and U.S. Patent App. Pub. No. 2011/0201490 A1, titled "Crack And Scratch Resistant Glass And Enclosures Made Therefrom," published Aug. 18, 2011, the contents of each of which are incorporated herein by reference in their entirety.

In the ion exchange treatment, which is optionally included in step 308, the etched glass-based article is contacted with a molten salt bath to produce the ion-exchanged glass-based article. In embodiments, the etched glass-based article may be submerged in the molten salt bath. In embodiments, the molten salt bath includes a molten nitrate salt. The molten nitrate salt may include $KNO_3$, $NaNO_3$, or combinations thereof. In embodiments, the molten salt bath comprises $NaNO_3$ and $KNO_3$. The molten salt bath may additionally include silicic acid.

The etched glass-based substrate may be exposed to the molten salt bath by dipping the etched glass-based substrate into the molten salt bath. Upon exposure to the etched glass-based substrate, the molten salt bath may, according to embodiments, be at a temperature of greater than or equal to 350° C. to less than or equal to 500° C., such as greater than or equal to 360° C. to less than or equal to 490° C., greater than or equal to 370° C. to less than or equal to 480° C., greater than or equal to 390° C. to less than or equal to 470° C., greater than or equal to 400° C. to less than or equal to 460° C., greater than or equal to 410° C. to less than or equal to 450° C., greater than or equal to 420° C. to less than or equal to 440° C., greater than or equal to 350° C. to less than or equal to 430° C., and any and all sub-ranges formed from any of the foregoing endpoints.

The ion exchange treatment may continue for any time period sufficient to produce the desired stress characteristics in the glass-based article. In embodiments, the etched glass-based substrate may be exposed to the molten salt bath for a time period greater than or equal to 10 minutes to less than or equal to 500 minutes, such as greater than or equal to 10 minutes to less than or equal to 300 minutes, greater than or equal to 20 minutes to less than or equal to 490 minutes, greater than or equal to 30 minutes to less than or equal to 480 minutes, greater than or equal to 40 minutes to less than or equal to 470 minutes, greater than or equal to 50 minutes to less than or equal to 460 minutes, greater than or equal to 60 minutes to less than or equal to 450 minutes, greater than or equal to 70 minutes to less than or equal to 440 minutes, greater than or equal to 80 minutes to less than or equal to 430 minutes, greater than or equal to 90 minutes to less than or equal to 420 minutes, greater than or equal to 100 minutes to less than or equal to 410 minutes, greater than or equal to 110 minutes to less than or equal to 400 minutes, greater than or equal to 120 minutes to less than or equal to 390 minutes, greater than or equal to 130 minutes to less than or equal to 380 minutes, greater than or equal to 140 minutes to less than or equal to 370 minutes, greater than or equal to 150 minutes to less than or equal to 360 minutes, greater than or equal to 160 minutes to less than or equal to 350 minutes, greater than or equal to 170 minutes to less than or equal to 340 minutes, greater than or equal to 180 minutes to less than or equal to 330 minutes, greater than or equal to 190 minutes to less than or equal to 320 minutes, greater than or equal to 200 minutes to less than or equal to 310 minutes, greater than or equal to 210 minutes to less than or equal to 300 minutes, greater than or equal to 220 minutes to less than or equal to 290 minutes, greater than or equal to 230 minutes to less than or equal to 280 minutes, greater than or equal to 240 minutes to less than or equal to 270 minutes, greater than or equal to 250 minutes to less than or equal to 260 minutes, and any and all sub-ranges formed from any of the foregoing endpoints.

The glass-based articles 100 are characterized by further characteristics besides distinctness-of-image and sparkle, such as haze level, surface roughness, and gloss 60° value.

The haze of the glass-based articles 100 is relatively low and may provide desirable optical properties and a pleasing aesthetic appearance. For example, the haze of the glass-based article provides an antiglare capability that improves performance in high ambient light conditions, such as bright sunlight. In some embodiments, the haze is less than or equal to 45%, such as less than or equal to 40%, less than or equal to 35%, less than or equal to 30%, less than or equal to 25%, less than or equal to 20%, less than or equal to 15%, less than or equal to 10%, less than or equal to 5%, or less. In embodiments, the haze is greater than or equal to 3% to less than or equal to 40%, such as greater than or equal to 5% to less than or equal to 35%, greater than or equal to 10% to less than or equal to 30%, greater than or equal to 15% to less than or equal to 25%, greater than or equal to 20% to less than or equal to 40%, and any and all sub-ranges formed between any of the foregoing endpoints. As used herein, haze refers to "transmittance haze," and is measured using a Haze-gard Transparency Transmission Haze Meter, according to ASTM D1003 "Standard Test Method for Haze and Luminous Transmittance of Transparent Plastics" using Illuminant C.

The glass-based articles 100 may have any surface roughness sufficient to produce the desired optical characteristics. The surface roughness also provides the glass-based articles 100 with a pleasing touch feel. In one or more embodiments, the glass-based articles 100 have a surface roughness greater than or equal to 100 nm to less than or equal to 400 nm, such as greater than or equal to 110 nm to less than or equal to 390 nm, greater than or equal to 120 nm to less than or equal to 380 nm, greater than or equal to 130 nm to less than or equal to 370 nm, greater than or equal to 140 nm to less than or equal to 360 nm, greater than or equal to 150 nm to less than or equal to 350 nm, greater than or equal to 160 nm to less than or equal to 340 nm, greater than or equal to 170 nm to less than or equal to 330 nm, greater than or equal to 180 nm to less than or equal to 320 nm, greater than or equal to 190 nm to less than or equal to 310 nm, greater than or equal to 200 nm to less than or equal to 300 nm, greater than or equal to 210 nm to less than or equal to 290 nm, greater than or equal to 220 nm to less than or equal to 280 nm, greater than or equal to 230 nm to less than or equal to 270 nm, greater than or equal to 240 nm to less than or equal to 260 nm, greater than or equal to 250 nm to less than or equal to 400 nm, and any and all sub-ranges formed from any of the foregoing endpoints. As used herein, unless otherwise specified, "surface roughness" refers to $R_a$, the arithmetical mean deviation of a measured profile. Unless otherwise specified, $R_a$ is measured on a Zygo 7000 with the following settings: Scan size was 180 microns by 220 microns; Objective: 20x Mirau; Image Zoom 2x; Camera resolution 0.2777 microns;

Filter: low Pass; Filter Type: Average; Filter Low Wavelength 0; Filter High Wavelength: 0.83169 microns.

The glass-based articles 100 may be characterized by a gloss value, such as a gloss 60° value. In embodiments, the glass-based articles 100 have a gloss 60° value of less than or equal to 40%, such as less than or equal to 35%, less than or equal to 30%, less than or equal to 25%, less than or equal to 20%, less than or equal to 15%, or less. In embodiments, the glass-based articles 100 have a gloss 60° value of greater than or equal to 10% to less than or equal to 40%, such as greater than or equal to 15% to less than or equal to 35%, greater than or equal to 20% to less than or equal to 30%, greater than or equal to 25% to less than or equal to 40%, greater than or equal to 15% to less than or equal to 40%, and any and all sub-ranges formed from any of the foregoing endpoints. Gloss 60° or gloss 60 refers to a measurement taken at 60° from vertical using a Rhopoint Gloss Meter.

EXAMPLES

Embodiments will be further clarified by the following examples. It should be understood that these examples are not limiting to the embodiments described above.

Examples 1

Glass samples were used that were formed from composition of 67.32 mol. % $SiO_2$, 12.65 mol. % $Al_2O_3$, 3.76 mol. % $B_2O_3$, 13.76 mol. % $Na_2O$, 0.01 mol. % $K_2O$, 2.37 mol. % MgO, and 0.04 mol. % CaO having a thickness of 1 mm. The samples were then subjected to four blasting conditions in Table I, marked as A, B, C, and D, utilizing SiC and $Al_2O_3$ abrasive particles to form abraded samples. The particle concentration in the media (water) was 5-15 microns, and the distance to spray was 10 to 15 cm. Sand blasting was performed while the glass sample moved at from 0.1 to 1 m/min at a vertical angle of 90 degrees.

TABLE I

| Sample | A | B | C | D |
|---|---|---|---|---|
| Average ParticleSize (microns) | 3-15 | 1-3 | 1-3 | 1-3 |
| Pressure (MPa) | 0.1-0.5 | 0.3-0.6 | 0.4-0.6 | 0.5-0.6 |
| Pressure (psi) | 14.5-72.5 | 43.5-87.0 | 58.0-87.0 | 72.5-87.0 |

Figure 4A:
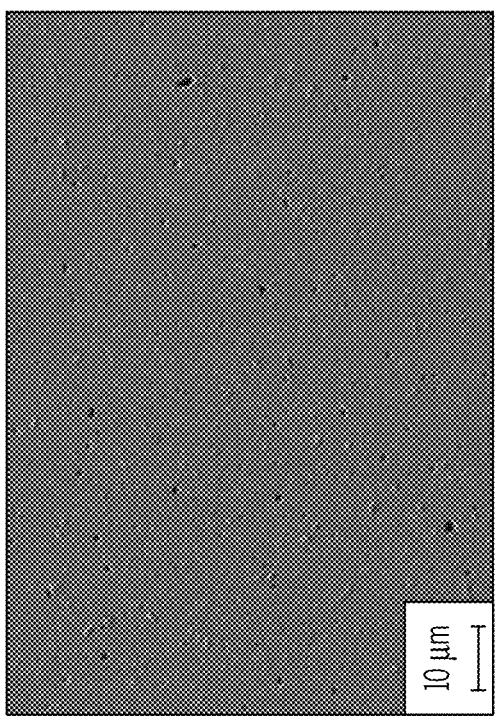
FIGS. 4A-4D depict scanning electron microscopy (SEM) images of abraded glass samples, according to one or more embodiments described herein.
Figure 4A:
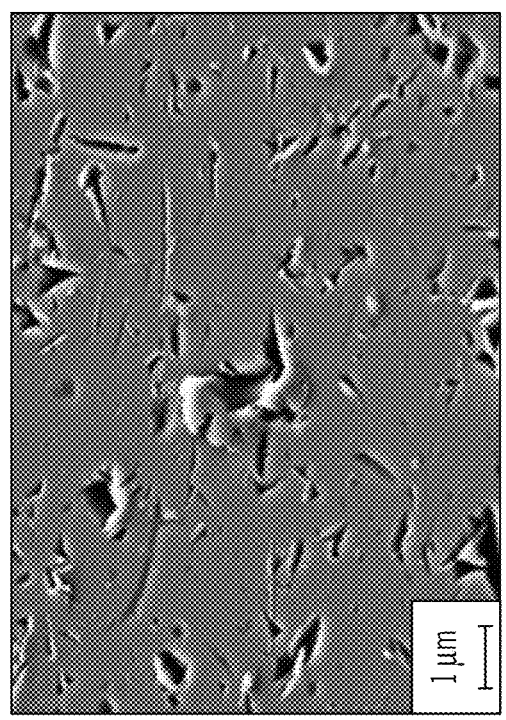
Figure 4B:
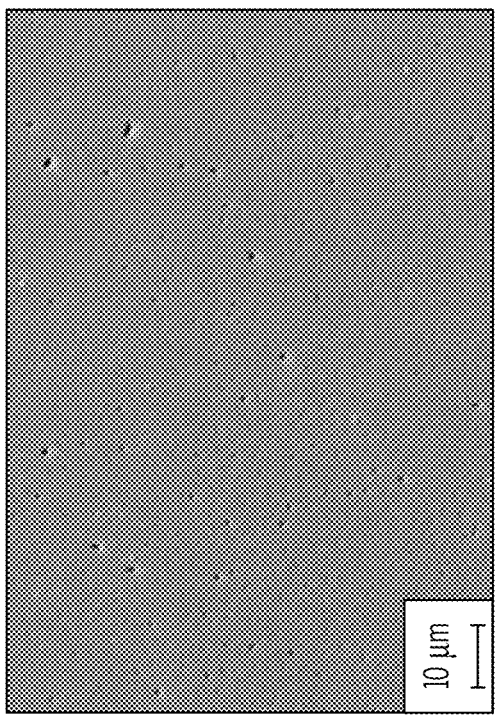
Figure 4B:
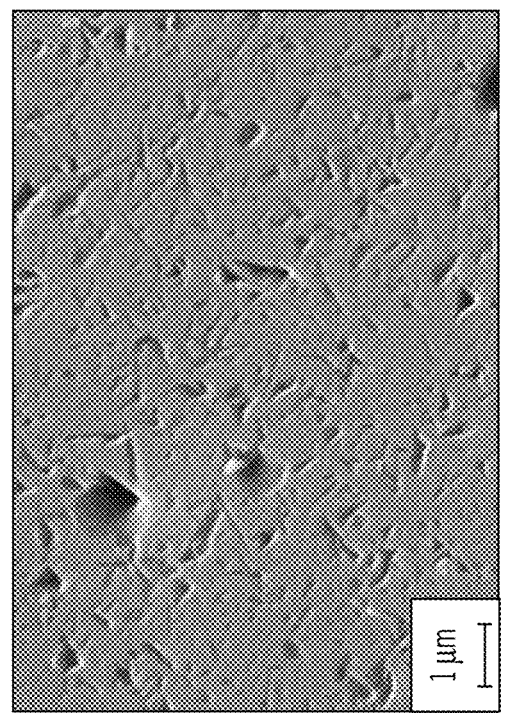
Figure 4D:
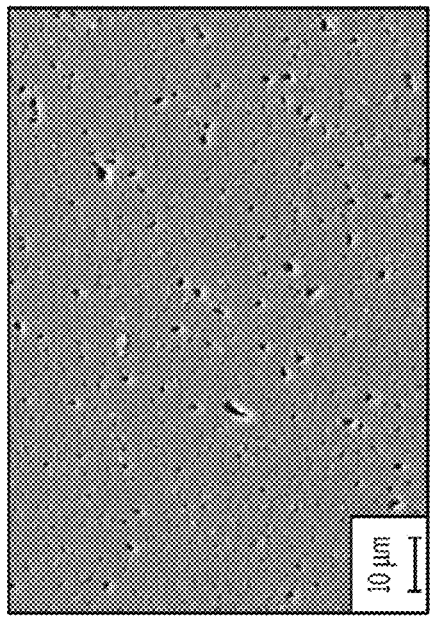
Figure 4D:
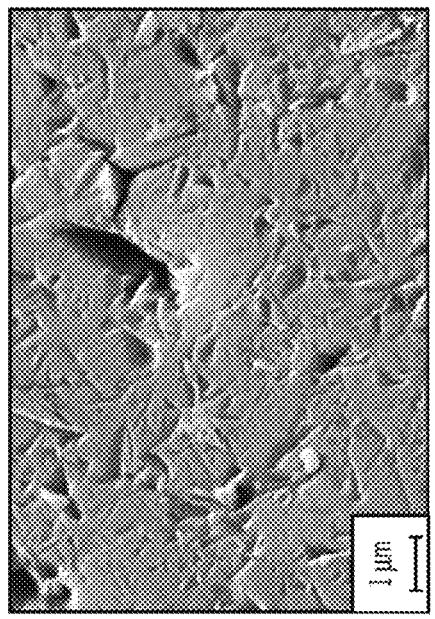
Figure 4C:
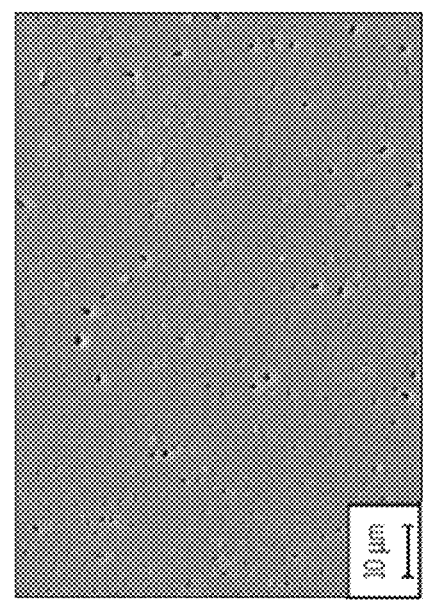
Figure 4C:
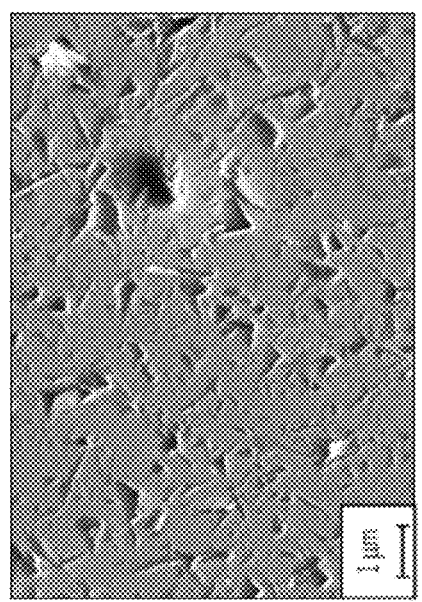
Figure 5A:
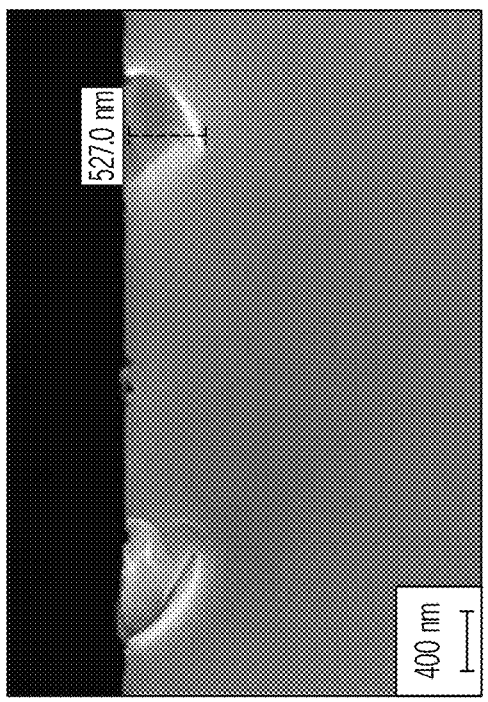
FIGS. 5A-5D depict cross-sectional views of the images of FIGS. 4A-4C, according to one or more embodiments described herein.
Figure 5B:
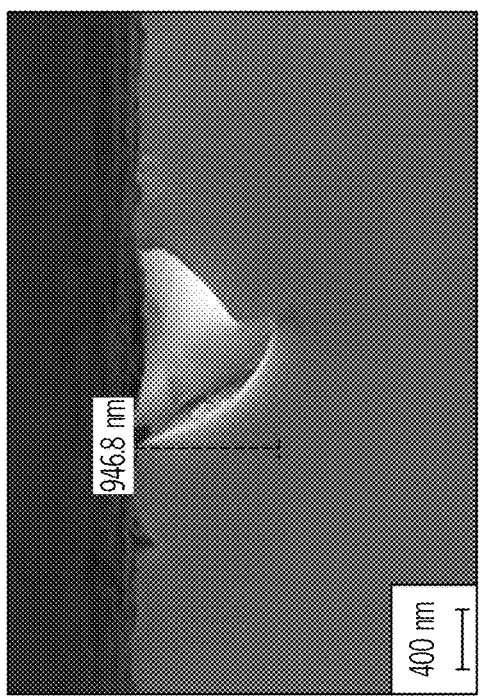
Figure 5C:
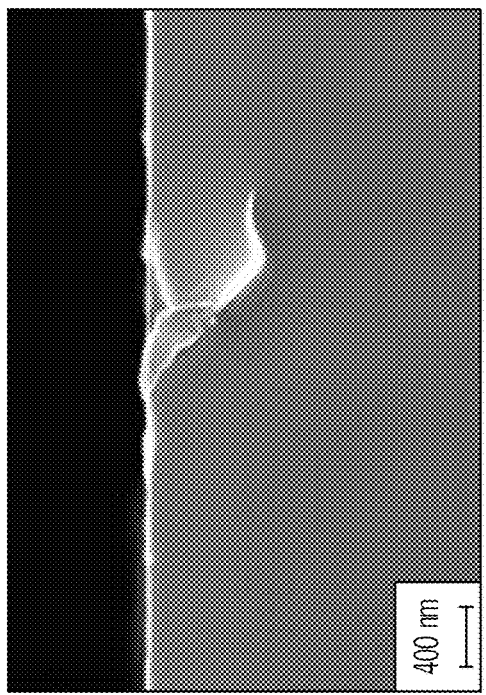
Figure 5D:
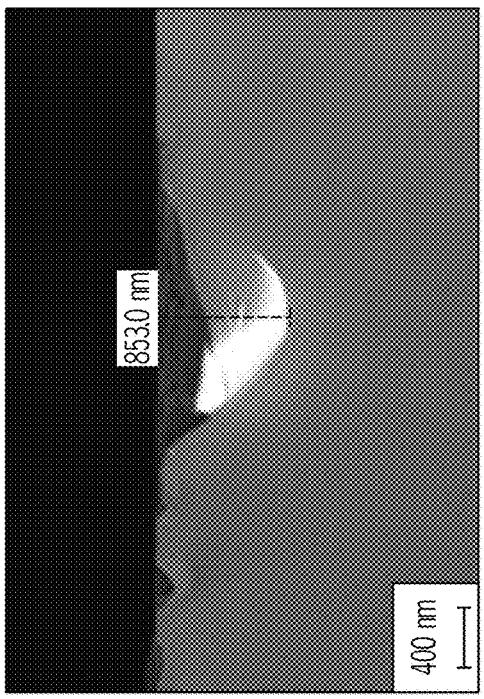
Figure 6:
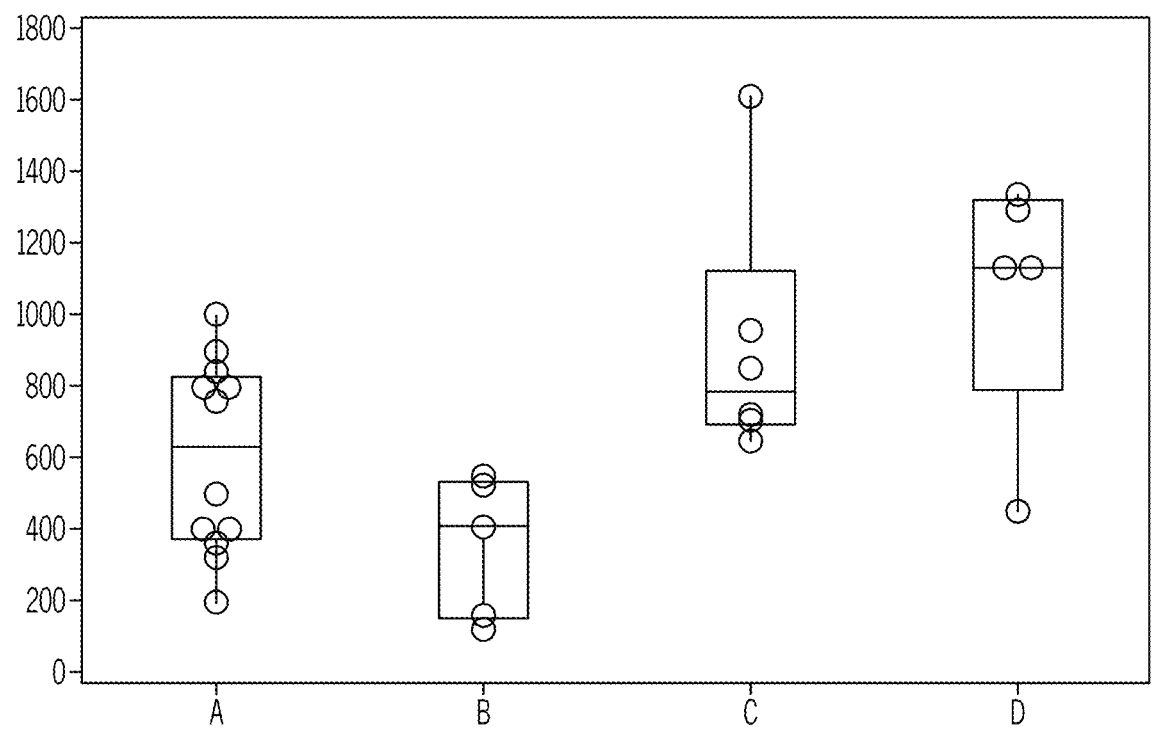
FIG. 6 shows abrasion depth for various samples where they axis is in nanometers, according to one or more embodiments described herein.

Microscopic images (SEM images) of the samples are shown in FIGS. 4A-4D. FIG. 4A shows Sample A, FIG. 4B shows Sample B, FIG. 4C shows Sample C, and FIG. 4D shows Sample D. Each of these figures shows the same sample at two different magnification levels. Additionally, FIGS. 5A-5D depict SEM images of cross-sections abraded glass samples, where FIG. 5A shows Sample A, FIG. 5B shows Sample B, FIG. 5C shows Sample C, and FIG. 5D shows Sample D. FIG. 6 shows data extracted from the SEM images of FIGS. 5A-5D, as well as images at other locations on the sample.

As is shown in the images of FIGS. 4A and 5A (Sample A) as compared to FIGS. 4B and 5B (Sample B), the use of finer media generates finer surface damage. Additionally, the use of increased sandblast pressure in FIGS. 4C and 5C (Sample C) and FIGS. 4D and 5D (Sample D) causes deeper surface damage and more density of surface damages. Regarding surface damage depth, FIG. 6 shows the depth in samples taken for Samples A, B, C, and D. A is shown with Sample A and compared to Sample B, smaller sandblast media produce shallower defects (assuming identical pressure). However, as pressure is increased, defect depth increases, as is shown in Samples B, C, and D.

Example 2

The samples of Example 1 were etched such that 15-20 microns of material was removed. The etchant was prepped by mixing 873.5 mL of Sodium Hydroxide (50 w % t Stock solution) with 148 mL DI Water to make around 1000 mL of 45% wt NaOH solution. The solution was heated to 120° C. The glass was etched to target 30% haze (70 min for Sample A, 24 minutes for Sample B, 40 minutes for Sample C, and 40 minutes from Sample D).

Figure 7D:
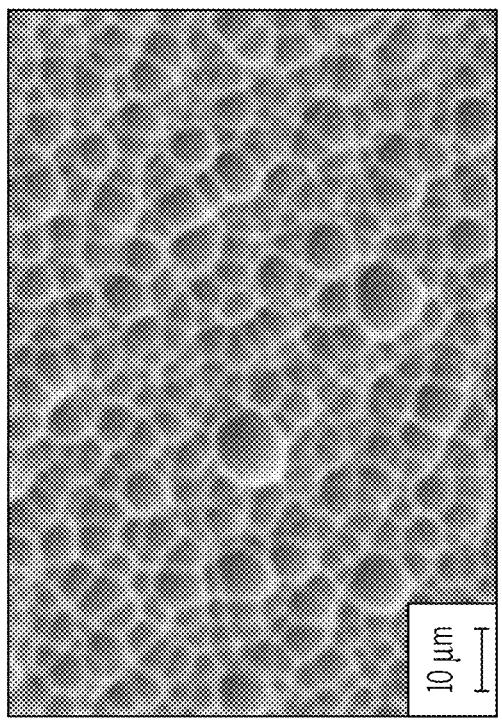
Figure 7D:
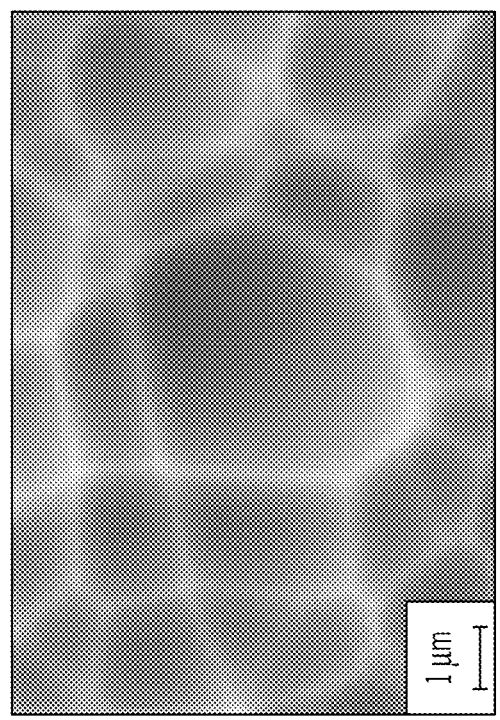
Figure 7C:
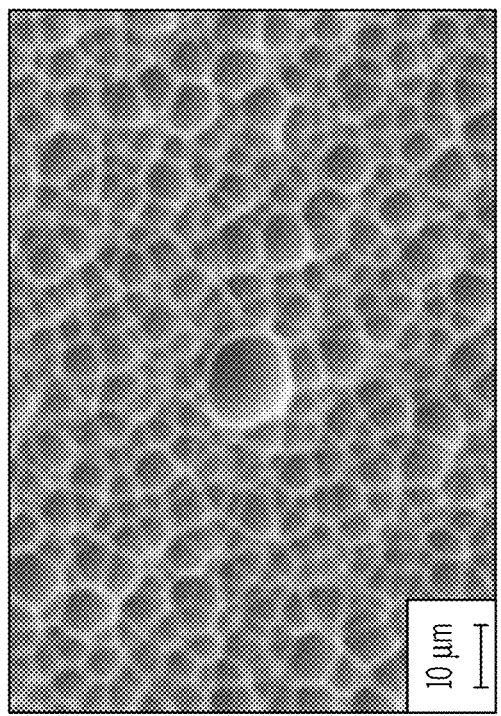
Figure 7C:
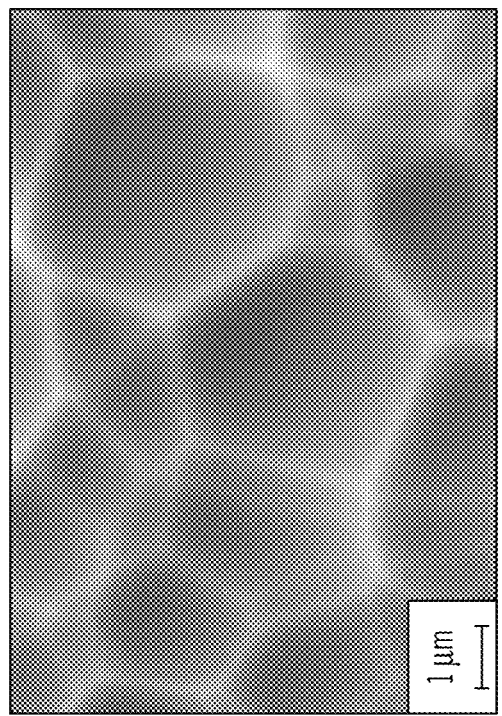

Microscopic images (SEM images) of the samples are shown in FIGS. 7A-7D. FIG. 7A shows Sample A, FIG. 7B shows Sample B, FIG. 7C shows Sample C, and FIG. 7D shows Sample D. Each of these figures shows the same sample at two different magnification levels. As is seen in the images, reduced sandblast media size causes smaller surface features (compare Sample A in FIG. 7A to Sample B in FIG. 7B). Additionally, increased sandblast pressure caused more uniform surface coverage (compare Samples A, B, and C in FIGS. 7B, 7C, and 7D).

Example 3

Additional samples were prepared, which are described in Table II. Samples were prepared using the abrasion techniques of Samples A, B, C, and D of Example 1. These samples were evaluated for features such as etch thickness (by weight loss through etching), sparkle at 140 ppi, haze, uncoupled distinctness-of-image, and roughness ($R_{max}$, $R_q$, and $R_a$).

TABLE II

| Etchant | Temperature (° C.) | Etch Time (min) | Etch Thickness (microns) | Haze (%) | Sparkle (140 ppi) (%) | Uncoupled Distinctness-of-image | Rmax (nm) | Ra (nm) | Rq (nm) |
|---|---|---|---|---|---|---|---|---|---|
| Sample A Abrasion Specifications ||||||||||
| 10% vol HF | Room Temperature | 0.7 | 3.23 | 55.4 | 2.12 | 98.64 | 30904.5 | 119.65 | 256.21 |
| 10% vol HF | Room Temperature | 2.1 | 7.52 | 59.6 | 2.35 | 95.44 | 34993.6 | 244.84 | 367.58 |
| 10% vol HF | Room Temperature | 3.4 | 11.89 | 53.4 | 2.58 | 92.84 | 16152 | 290.29 | 382.67 |
| 10% vol HF | Room Temperature | 4.7 | 16.05 | 46.4 | 2.92 | 91.96 | 18094.5 | 304.99 | 396.07 |
| 10% vol HF | Room Temperature | 6.4 | 21.56 | 38.7 | 3.27 | 92.17 | 11616.4 | 291.09 | 373.19 |
| 10% vol HF | Room Temperature | 12 | 39.08 | 24.3 | 3.98 | 91.2 | 4758.7 | 232.88 | 302.66 |
| 10% vol HF | Room Temperature | 14.8 | 47.76 | 20.1 | 4.3 | 90.7 | 5238.2 | 198.24 | 257.21 |
| 10% vol HF | Room Temperature | 18.5 | 58.74 | 16.2 | 4.52 | 90.57 | 3163.5 | 159.63 | 206.37 |
| 10% vol HF | Room Temperature | 22.2 | 70.61 | 13.5 | 4.71 | 90.26 | 3057.2 | 136.48 | 177.07 |
| 45% wt NaOH | 120 | 4 | 2.41 | 45.6 | 1.89 | 98.91 | 8707.5 | 72.87 | 166.78 |

TABLE II-continued

| Etchant | Temperature (° C.) | Etch Time (min) | Etch Thickness (microns) | Haze (%) | Sparkle (140 ppi) (%) | Uncoupled Distinctness-of-image | Rmax (nm) | Ra (nm) | Rq (nm) |
|---|---|---|---|---|---|---|---|---|---|
| 45% wt NaOH | 120 | 12 | 8.29 | 53.4 | 2.59 | 96.15 | 12358.5 | 217.58 | 321.31 |
| 45% wt NaOH | 120 | 20 | 7.36 | 48.8 | 2.84 | 92.61 | 12548.3 | 281.73 | 373.99 |
| 45% wt NaOH | 120 | 30 | 27.28 | 38.5 | 3.3 | 91.59 | 10116.1 | 284.48 | 365.19 |
| 45% wt NaOH | 120 | 40 | 29.58 | 30.8 | 3.64 | 91.36 | 11205.4 | 268.89 | 345.24 |
| 45% wt NaOH | 120 | 50 | 35.92 | 27.9 | 3.8 | 91.16 | 7179.3 | 249.64 | 323.5 |
| 45% wt NaOH | 120 | 70 | 51.47 | 20.4 | 4.32 | 90.57 | 6475.3 | 203.73 | 265.03 |
| 45% wt NaOH | 120 | 93.5 | 63.92 | 16.5 | 4.67 | 89.84 | 4084.6 | 156.93 | 203.97 |
| 45% wt NaOH | 120 | 105 | 72.21 | 14.4 | 4.78 | 89.53 | 3819.8 | 139.44 | 180.19 |
| Sample B Abrasion Specifications | | | | | | | | | |
| 10% vol HF | Room Temperature | 0.7 | 3.26 | 75.4 | 1.69 | 97.16 | 10827.7 | 225.71 | 323.13 |
| 10% vol HF | Room Temperature | 2.1 | 7.57 | 67.9 | 2.09 | 90.95 | 16222.7 | 317.83 | 411.11 |
| 10% vol HF | Room Temperature | 3.4 | 11.8 | 56.6 | 2.56 | 91.55 | 18517.8 | 329.41 | 426.39 |
| 10% vol HF | Room Temperature | 4.7 | 16.15 | 48 | 2.89 | 91.88 | 15593.1 | 318.31 | 413.29 |
| 10% vol HF | Room Temperature | 6.4 | 21.67 | 39.7 | 3.27 | 91.98 | 14875.2 | 295.83 | 382.72 |
| 10% vol HF | Room Temperature | 12 | 39.17 | 24.8 | 4.05 | 90.02 | 11106.6 | 235.13 | 305.54 |
| 10% vol HF | Room Temperature | 14.8 | 48.54 | 4.37 | 89.82 | 6054.2 | 195.61 | 254.3 |
| 10% vol HF | Room Temperature | 18.5 | 58.86 | 16.7 | 4.64 | 88.9 | 2920.4 | 163.32 | 211.45 |
| 10% vol HF | Room Temperature | 22.2 | 71.11 | 14 | 4.85 | 89.42 | 2844.7 | 142.03 | 182.85 |
| 45% wt NaOH | 120 | 4 | 2.7 | 67.4 | 1.79 | 98.17 | 11429.1 | 155.71 | 265.04 |
| 45% wt NaOH | 120 | 12 | 8.71 | 62.5 | 2.27 | 92.22 | 15180.9 | 299.51 | 389.53 |
| 45% wt NaOH | 120 | 20 | 17.43 | 52 | 2.7 | 91.76 | 11196.9 | 317.43 | 405.07 |
| 45% wt NaOH | 120 | 30 | 18.68 | 40.6 | 3.26 | 91.54 | 14386.1 | 299.49 | 385.39 |
| 45% wt NaOH | 120 | 40 | 29.96 | 31 | 3.72 | 91.2 | 7156.3 | 269.43 | 348.16 |
| 45% wt NaOH | 120 | 50 | 36.34 | 28.8 | 3.9 | 91.13 | 7833.9 | 254.98 | 330.55 |
| 45% wt NaOH | 120 | 70 | 51.55 | 21.7 | 4.46 | 89.39 | 4444.9 | 205.01 | 269.48 |
| 45% wt NaOH | 120 | 93.5 | 63.79 | 15.8 | 4.72 | 88.72 | 3021.6 | 157.98 | 205.38 |
| 45% wt NaOH | 120 | 105 | 72.39 | 13.8 | 4.94 | 88 | 3229.9 | 142.94 | 184.66 |
| Sample C Abrasion Specifications | | | | | | | | | |
| 10% vol HF | Room Temperature | 0.7 | 2.33 | 27.7 | 2.05 | 99.25 | 4510 | 17.25 | 67.56 |
| 10% vol HF | Room Temperature | 2.1 | 6.66 | 45.3 | 3.22 | 98.29 | 7032.4 | 88.81 | 206.03 |
| 10% vol HF | Room Temperature | 3.4 | 10.62 | 50.2 | 3.43 | 96.53 | 10146 | 165.23 | 285.95 |
| 10% vol HF | Room Temperature | 4.7 | 14.9 | 49.2 | 3.57 | 93.95 | 9982.2 | 220.3 | 330.82 |
| 10% vol HF | Room Temperature | 6.4 | 19.66 | 46.9 | 3.58 | 89.19 | 12947 | 271.45 | 370.28 |
| 10% vol HF | Room Temperature | 12 | 36.65 | 35 | 4.01 | 72.84 | 10645.6 | 296.82 | 378.35 |
| 10% vol HF | Room Temperature | 14.8 | 44.88 | 29.5 | 4.33 | 73.32 | 5676.8 | 276.18 | 350.85 |
| 10% vol HF | Room Temperature | 18.5 | 55.65 | 24.3 | 4.68 | 75.17 | 4997 | 243.48 | 309.51 |
| 10% vol HF | Room Temperature | 22.2 | 70.3 | 19.8 | 4.91 | 76.82 | 5574.1 | 207.05 | 264.03 |
| 45% wt NaOH | 120 | 4 | 2.53 | 27.6 | 2.08 | 99.23 | 4541.4 | 28.5 | 93.9 |
| 45% wt NaOH | 120 | 12 | 8.14 | 45.5 | 3.42 | 97.6 | 11815.9 | 136.54 | 250.57 |
| 45% wt NaOH | 120 | 20 | 21.52 | 46.8 | 3.7 | 94.63 | 10462.1 | 201.03 | 311.77 |
| 45% wt NaOH | 120 | 30 | 13.83 | 43.1 | 3.83 | 87.68 | 10795.7 | 255.83 | 353.62 |
| 45% wt NaOH | 120 | 40 | 29.35 | 38 | 4.03 | 78.69 | 10248.9 | 285.67 | 370.75 |
| 45% wt NaOH | 120 | 50 | 35.92 | 34.9 | 4.1 | 72.61 | 11560.9 | 284.22 | 360.58 |
| 45% wt NaOH | 120 | 70 | 51.5 | 26.6 | 4.49 | 71.15 | 5553.8 | 254.22 | 321.74 |
| 45% wt NaOH | 120 | 93.5 | 63.1 | 21.8 | 4.82 | 72.06 | 5405.7 | 218.89 | 278.79 |
| 45% wt NaOH | 120 | 105 | 72.06 | 19 | 5.12 | 71.76 | 3575.8 | 196.06 | 249.2 |
| Sample D Abrasion Specifications | | | | | | | | | |
| 10% vol HF | Room Temperature | 0.7 | 2.93 | 37.7 | 1.97 | 99.05 | 20248.7 | 60.45 | 168.05 |
| 10% vol HF | Room Temperature | 2.1 | 6.54 | 47.5 | 2.52 | 97.95 | 30901.3 | 158.7 | 313 |
| 10% vol HF | Room Temperature | 3.4 | 10.19 | 46.9 | 2.76 | 96.28 | 32920.3 | 220.87 | 360.28 |
| 10% vol HF | Room Temperature | 4.7 | 13.83 | 43.8 | 2.92 | 94.86 | 36794.8 | 251.53 | 381.98 |
| 10% vol HF | Room Temperature | 6.4 | 18.69 | 38.6 | 3.09 | 93.61 | 33853.3 | 267.73 | 400.37 |
| 10% vol HF | Room Temperature | 12 | 34.82 | 25.3 | 3.76 | 92.53 | 26331.4 | 231.86 | 312.04 |
| 10% vol HF | Room Temperature | 14.8 | 42.41 | 21.2 | 3.99 | 91.78 | 17528.5 | 193.54 | 255.44 |
| 10% vol HF | Room Temperature | 18.5 | 54.98 | 16.5 | 4.3 | 91.37 | 12260.1 | 153.55 | 200.6 |
| 10% vol HF | Room Temperature | 22.2 | 63.59 | 14.2 | 4.42 | 91.39 | 3268.2 | 136.45 | 175.57 |
| 45% wt NaOH | 120 | 4 | 2.51 | 31.8 | 1.76 | 99.14 | 17015.6 | 48.22 | 133.39 |
| 45% wt NaOH | 120 | 12 | 5.74 | 41 | 2.46 | 98.45 | 25003.1 | 121.07 | 262.69 |
| 45% wt NaOH | 120 | 20 | 8.79 | 42 | 2.78 | 97.61 | 27868.6 | 170.22 | 301.26 |
| 45% wt NaOH | 120 | 30 | 12.25 | 27.6 | 3.03 | 98.09 | 24519.1 | 131.6 | 247.06 |
| 45% wt NaOH | 120 | 40 | 20.41 | 26.3 | 3.51 | 96.63 | 22283.5 | 168.65 | 271.97 |
| 45% wt NaOH | 120 | 50 | 24.55 | 24.9 | 3.66 | 96.07 | 21413.9 | 178.23 | 271.38 |
| 45% wt NaOH | 120 | 70 | 33.08 | 22 | 3.94 | 94.78 | 16808.9 | 180.15 | 255.4 |
| 45% wt NaOH | 120 | 85 | 37.25 | 24.1 | 3.82 | 92.26 | 17396.1 | 210.45 | 278.15 |
| 45% wt NaOH | 120 | 105 | 45.48 | 20.2 | 4.06 | 91.81 | 16603.5 | 180.23 | 235.15 |

The data of Table II, as well as additional data from sample of Example 2 were evaluated for uncoupled DOI. The results are shown in Table III. As shown, the mean DOI is increased when the small media of Sample B, C, and D are utilized.

Table IV depicts additional properties of the samples prepared regarding distinctness-of-image.

TABLE III

| Abrasion Process | Number of Samples | Mean DOI | Standard Deviation | Minimum | Maximum |
|---|---|---|---|---|---|
| A | 18 | 84.5 | 11.5 | 71.2 | 99.3 |
| B | 18 | 95.2 | 2.8 | 91.4 | 99.1 |
| C | 44 | 91.3 | 1.6 | 87.4 | 96.2 |
| D | 42 | 88.7 | 3.6 | 78 | 97.2 |

The data shows that at each of abrasion specifications can be used to make samples having relatively low sparkle and relatively high distinctness of image (DOI). For example, sample A specification can produce sparkle of 2.84% with DOI of 92.6%, sparkle of 3.64% and DOI of 91.36%, or sparkle of 4.32 and DOI of 90.57%. Sample B specification can produce sparkle of 2.27% with DOI of 92.22%, sparkle of 3.26% and DOI of 91.54%, sparkle of 3.72% and DOI of 91.2%, or sparkle of 4.72% and DOI of 88.72%. Sample C specification can produce sparkle of 3.7% with DOI of 94.63%, or sparkle of 4.03 and DOI of 78.69%. Sample D specification can produce sparkle of 2.78% with DOI of 97.61%, sparkle of 3.03% and DOI of 98.09%, or sparkle of 4.06 and DOI of 91.81%.

One or more aspects of the present application are disclosed herein. A first aspect may be a textured glass-based article comprising: a glass-based substrate comprising a first major surface and a second major surface, the first major surface opposite the second major surface; wherein at least a portion of one or both of the first major surface and the second major surface is textured, wherein the portion of the one or more of the first major surface and the second major surface that are textured have a roughness $R_a$ of from 100 nm to 400 nm, and wherein the portion of the one or both of the first major surface and the second major surface that are textured have: a sparkle at 140 ppi of less than or equal to 5%; and an uncoupled distinctness-of-image of at least 78%.

Another aspect may be any previous aspect, wherein the portion of the one or both of the first major surface and the second major surface that are textured have a haze of less than or equal to 45%.

Another aspect may be any previous aspect, wherein the portion of the one or both of the first major surface and the second major surface that are textured are not coated with an optical coating.

Another aspect may be any previous aspect, wherein the entire first major surface is textured.

Another aspect may be any previous aspect, wherein the glass-based substrate comprises glass ceramic.

Another aspect may be any previous aspect, wherein the glass-based substrate comprises alkali aluminosilicate glass or alkaline earth aluminosilicate glass.

Another aspect may be any previous aspect, wherein the portion of the one or both of the first major surface and the second major surface that are textured have: a sparkle at 140 ppi of less than or equal to 4%; and an uncoupled distinctness-of-image of at least 90%.

Another aspect may be a consumer electronic product comprising: a housing having a front surface, a back surface and side surfaces; electrical components provided at least partially within the housing, the electrical components including at least a controller, a memory, and a display, the display being provided at or adjacent the front surface of the housing; and a cover substrate disposed over the display; wherein at least a portion of at least one of the housing and the cover substrate comprises the textured glass-based article of any other aspect.

Another aspect may be a method for making a textured glass-based article, the method comprising: abrading at least a portion of a first major surface, a second major surface, or both, of a glass-based substrate to form an abraded surface by propelling abrasive particles against the surface; and etching the abraded surface with an etchant to form a textured glass-based substrate; wherein the abrading of the surface of the glass-based substrate is with an abrasive media having an average dimeter of less than or equal to 3 microns.

Another aspect may be any previous aspect, wherein the abrasive particles are propelled by a fluid medium at a pressure of greater than or equal to 40 psi.

Another aspect may be any previous aspect, wherein the etching is for a time period of from 30 minutes to 400 minutes, and wherein the etchant is an aqueous hydroxide solution with a hydroxide concentration of from 5 wt % to 50 wt %.

Another aspect may be any previous aspect, further comprising ion exchanging the etched glass-based substrate with a molten salt bath.

Another aspect may be any previous aspect, wherein the etchant comprises NaOH, KOH, or combinations thereof.

Another aspect may be any previous aspect, wherein the etching removes from 5 μm to 50 μm of material from the abraded surface.

Another aspect may be any previous aspect, wherein the etchant is at a temperature of from 90° C. to 140° C.

Another aspect may be any previous aspect, wherein the abrasive particles comprise at least one of sand, $Al_2O_3$, SiC, $SiO_2$, and combinations thereof.

Another aspect may be any previous aspect, wherein the abrasive particles are propelled from a nozzle at a distance from the surface of from 5 cm to 20 cm.

Another aspect may be any previous aspect, wherein the abrasive particles are propelled by a fluid medium at a pressure of from 43.5 psi to 87 psi.

Another aspect may be any previous aspect, wherein the abrasive particles are propelled by a fluid medium at a pressure of from 58 psi to 87 psi.

Another aspect may be any previous aspect, wherein the abrasive particles are propelled by a fluid medium at a pressure of from 72.5 psi to 87 psi.

Another aspect may be any previous aspect, wherein a portion of the one or both of the first major surface and the second major surface that are textured have: a sparkle at 140 ppi of less than or equal to 5%; and an uncoupled distinctness-of-image of at least 78%.

Another aspect may be any previous aspect, wherein a portion of the one or both of the first major surface and the second major surface that are textured have a haze of less than or equal to 45%.

Another aspect may be a textured glass-based article comprising: a glass-based substrate comprising a first major surface and a second major surface, the first major surface opposite the second major surface; wherein at least a portion of one or both of the first major surface and the second major surface is textured, wherein the portion of the one or both of the first major surface and the second major surface that are textured have: a sparkle at 140 ppi of less than or equal to 5%; an uncoupled distinctness-of-image of at least 78%; a haze of less than or equal to 45%; and a roughness $R_a$ of from 100 nm to 400 nm.

Another aspect may be any previous aspect, wherein the entire first major surface is textured.

Another aspect may be any previous aspect, wherein the glass-based substrate comprises glass ceramic.

Another aspect may be any previous aspect, wherein the glass-based substrate comprises alkali aluminosilicate glass or alkaline earth aluminosilicate glass.

Another aspect may be any previous aspect, wherein the portion of the one or both of the first major surface and the second major surface that are textured are not coated with an optical coating.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A textured glass-based article comprising:
   a glass-based substrate comprising a first major surface and a second major surface, the first major surface opposite the second major surface;
   wherein at least a portion of one or both of the first major surface and the second major surface is textured and comprises surface features extending into a depth of the glass-based substrate, wherein the portion of the one or both of the first major surface and the second major surface that are textured have a roughness $R_a$ of from 110 nm to 270 nm, and wherein the portion of the one or both of the first major surface and the second major surface that are textured have:
   a sparkle at 140 ppi of less than or equal to 5%; and
   an uncoupled distinctness-of-image of at least 90%.

2. The textured glass-based article of claim 1, wherein the portion of the one or both of the first major surface and the second major surface that are textured have a haze of less than or equal to 45%.

3. The textured glass-based article of claim 1, wherein the portion of the one or both of the first major surface and the second major surface that are textured are not coated with an optical coating.

4. The textured glass-based article of claim 1, wherein the entire first major surface is textured.

5. The textured glass-based article of claim 1, wherein the glass-based substrate comprises glass ceramic.

6. The textured glass-based article of claim 1, wherein the glass-based substrate comprises alkali aluminosilicate glass or alkaline earth aluminosilicate glass.

7. The textured glass-based article of claim 1, wherein the portion of the one or both of the first major surface and the second major surface that are textured have:
   a sparkle at 140 ppi of less than or equal to 4%; and
   an uncoupled distinctness-of-image of at least 90%.

8. A consumer electronic product comprising:
   a housing having a front surface, a back surface and side surfaces;
   electrical components provided at least partially within the housing, the electrical components including at least a controller, a memory, and a display, the display being provided at or adjacent the front surface of the housing; and
   a cover substrate disposed over the display;
   wherein at least a portion of at least one of the housing and the cover substrate comprises the textured glass-based article of claim 1.

9. The textured glass-based article of claim 1, wherein the portion of the one or both of the first major surface and the second major surface that are textured have a roughness $R_a$ of from 130 nm to 250 nm.

10. A textured glass-based article comprising:
    a glass-based substrate comprising a first major surface and a second major surface, the first major surface opposite the second major surface;
    wherein at least a portion of one or both of the first major surface and the second major surface is textured and comprises surface features extending into a depth of the glass-based substrate, wherein the portion of the one or both of the first major surface and the second major surface that are textured have:
    a sparkle at 140 ppi of less than or equal to 5%;
    an uncoupled distinctness-of-image of at least 90%;
    a haze of less than or equal to 45%; and
    a roughness $R_a$ of from 110 nm to 270 nm.

11. The textured glass-based article of claim 10, wherein the entire first major surface is textured.

12. The textured glass-based article of claim 10, wherein the glass-based substrate comprises glass ceramic.

13. The textured glass-based article of claim 10, wherein the glass-based substrate comprises alkali aluminosilicate glass or alkaline earth aluminosilicate glass.

14. The textured glass-based article of claim 10, wherein the portion of the one or both of the first major surface and the second major surface that are textured are not coated with an optical coating.

15. The textured glass-based article of claim 10, wherein the portion of the one or both of the first major surface and the second major surface that are textured have a roughness $R_a$ of from 130 nm to 250 nm.

* * * * *